Jan. 3, 1933.   G. K. SHOJI   1,892,685
PINEAPPLE TIDBIT MACHINE
Filed Jan. 9, 1930   2 Sheets-Sheet 2
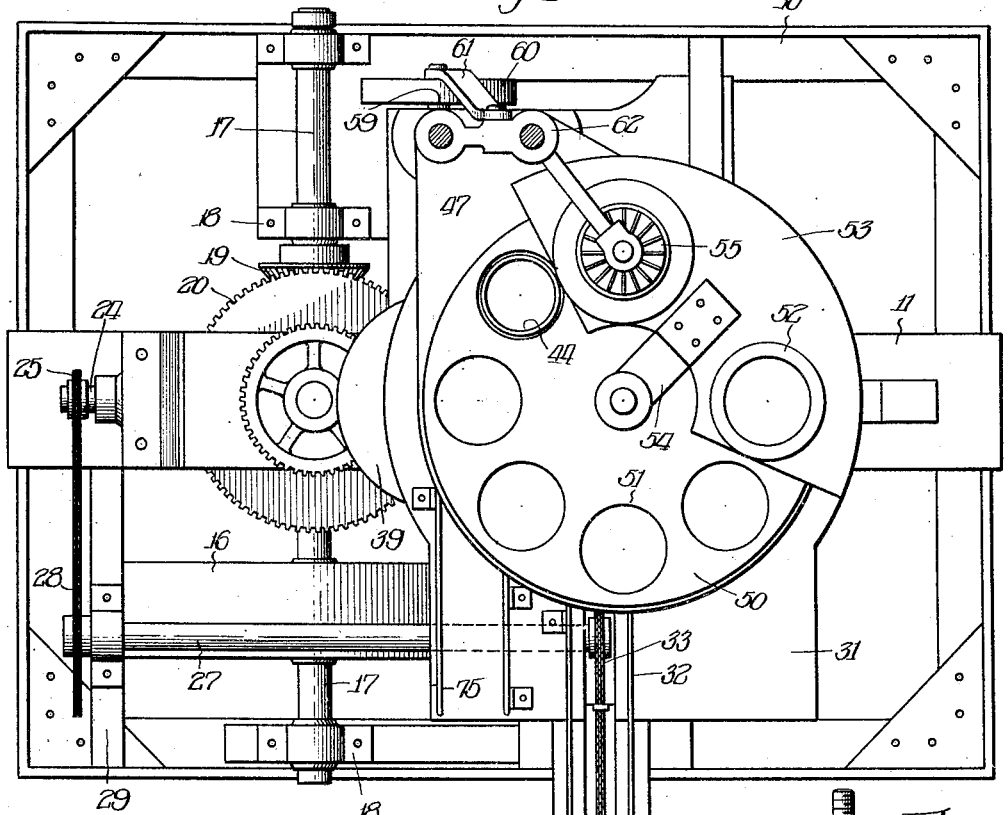
Inventor:
George K. Shoji,
By Wilkinson, Huxley, Byron & Knight
attys.

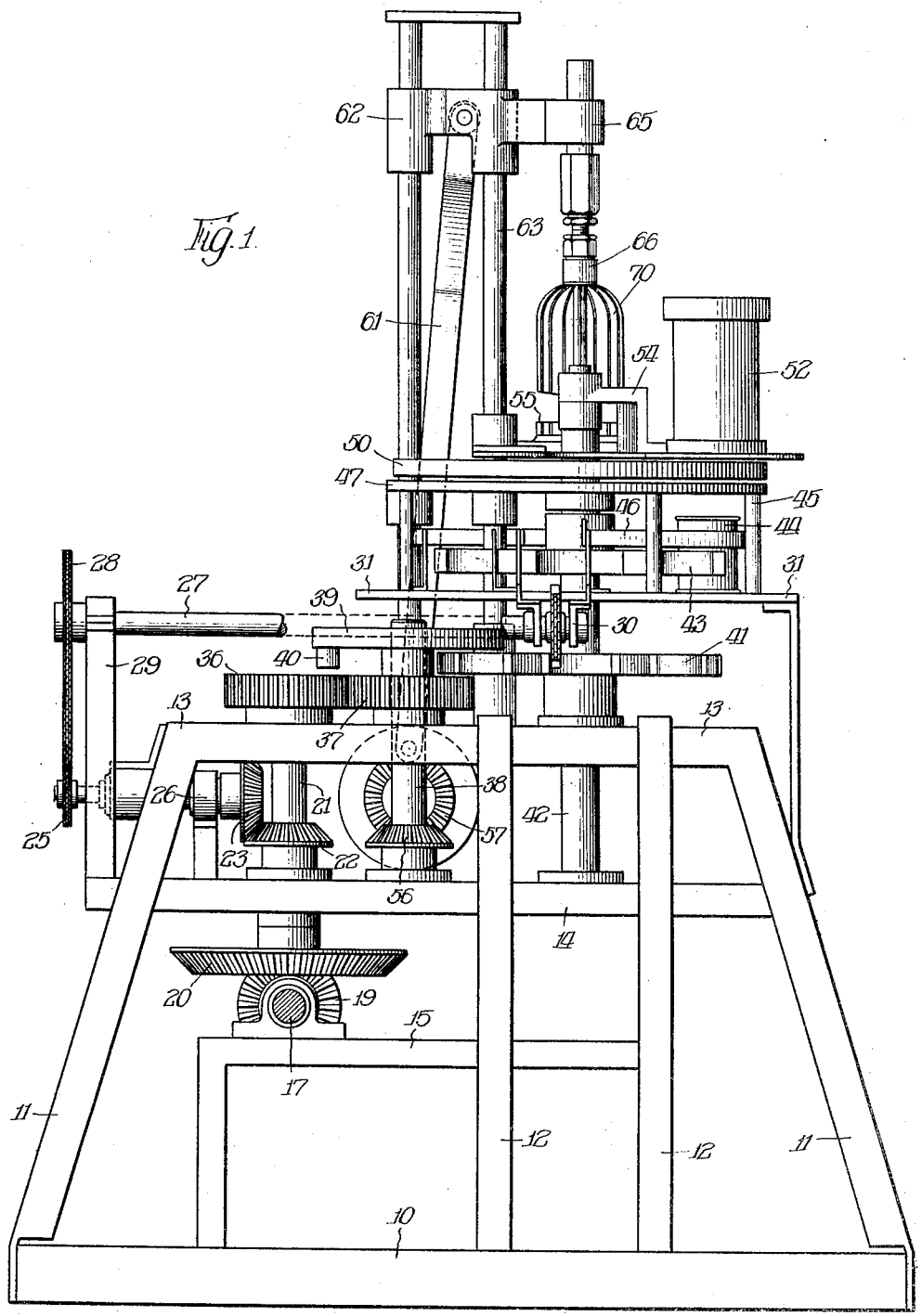

Patented Jan. 3, 1933

1,892,685

UNITED STATES PATENT OFFICE

GEORGE K. SHOJI, OF HONOLULU, TERRITORY OF HAWAII, ASSIGNOR TO LIBBY, McNEILL & LIBBY, OF CHICAGO, ILLINOIS, A CORPORATION OF MAINE

PINEAPPLE TIDBIT MACHINE

Application filed January 9, 1930. Serial No. 419,523.

The invention relates to a cutting machine and has reference more particularly to a machine for cutting into segment form, vegetables or fruits, such as pineapple for example, and feeding the same directly into cans.

It has been the custom in the canning industry, especially in the canning of pineapple, to cut or trim the sides of the fruit so as to form the core or central part into a cylindrical shape, which is then sliced into slices of any desired thickness and canned as such. However, it has been found that portions of the core or cylindrical part, especially the top and bottom portions, are sometimes imperfect, due to the trimming of the sides of the fruit, and as such are undesirable for canning in sliced form. These imperfect slices of the fruit are segregated from the perfect ones and cut into segments, or what is more commonly known to the trade as tidbits.

Heretofore the cutting of the slices into such form and the feeding of the same into cans has been performed in several operations, using several machines. It is therefore one of the objects of the present invention to provide a machine for cutting vegetables and fruits into tid-bit form, which will feed the same directly into cans, thus eliminating the unnecessary number of operations heretofore required.

A yet further object is to provide a cutting machine especially adapted for cutting slices of pineapple, which will be automatic in operation, simple in construction and of low cost in maintenance.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary side elevational view of a cutting machine constructed in accordance with the present invention.

Figure 2 is a top plan view of the same.

Figure 3 is a detail view of the stationary supporting plate showing the knife guides positioned in one of the openings.

Figure 4 is a detail view, parts being shown in the section of the cutting knife.

The cutting and feeding mechanism proper is supported from a suitable frame, consisting of a base plate 10, upright sides supports 11 and transfer straps 12. Secured to the upright portion of the sides supports 11 is a cross beam 13, which is braced by means of the transfer straps 12. Suitable cross members 14 and 15 are also provided for supporting the rotating members to be hereinafter more fully described.

Referring to Figure 2 of the drawings, the pulley 16 is driven from any suitable source of power, such as an electric motor, which in turn drives the main operating shaft 17, extending the width of the frame and journaled in bearings 18. By means of bevel gears 19 and 20, the vertical shaft 21 is driven from the main operating shaft, which in turn through gears 22 and 23 serves to drive shaft 24 to the outer end of which, is secured a suitable sprocket member 25. Bearings 26 journal the shaft upon the cross member 14. Spaced from the shaft 24 and extending parallel therewith is a second shaft 27, also provided with a sprocket, designated 28, fitted to its outer end. The shaft 27 is mounted for rotation in a suitable supporting member 29 at one end and suporting guides 30 at its other end. A plate 31 is supported in a suitable manner from the frame and has secured thereto spaced guides 32—32 for directing the empty cans into the machine. At each end of the directing guides is disposed a sprocket wheel 33 and an endless chain 34 travelling thereover. The endless chain is provided with cleats 35, as shown, spaced every five or six inches throughout its length, which serve to present a can to the machine in proper timing relation to the rest of the mechanism. The chain 34 is driven from shaft 27, which in turn is mechanically connected through sprocket 25 and 28 to shaft 24 and thus to the main operating shaft.

The shaft 21 has firmly secured to its upright end a gear 36 which meshes with the similar gear 37 secured to shaft 38. Located adjacent to gear 37 and also secured to shaft 38 is a plate member 39, having a depending tooth 40 which constitutes the actuating means for a Geneva gear 41. The latter gear is secured to a vertically extending shaft 42, having supporting engagement upon a cross beam 14. As the plate member 39 is rotated by actuation through gear 36, the depending tooth 40 will once in each revolution engage in suitable notches, provided in the Geneva gear and rotate the gear a fractional part of one revolution, thus imparting to shaft 42 an intermittent rotation. The can feeding mechanism proper is located upon plate 31 and consists in a feeding member or plate 43, having a number of semi-circular cut-out portions around its periphery, into which the cans, designated 44, are located as they are fed from the revolving chain 34. The member 43 is secured to the shaft 42 and has therefore an intermittent rotation, so that each movement will serve to present a semi-circular opening directly in front of the spaced guides 32, to receive a can therefrom. Upright supports 45, have secured thereto a circular strap 46 surrounding the feeding plate to prevent the cans from leaving their located opening.

Mounted upon the supports 45 is a stationary plate 47, which, as shown in detail in Figure 3, is provided with two spaced openings, 48 and 49, the purpose of which will be presently described. Also mounted upon the shaft 42 but spaced above the plate 47 is a perforated plate 50, having a series of openings 51 located around its outer edge, as shown in Figure 2. This plate is also adapted to have the intermittent rotation of shaft 42, so that both the plate and feeding member 43 are stepped around in unison. It is also necessary to have the perforated plate 50 so adjusted on shaft 42 that the openings 51 will be alined with the openings in the top of the cans when they are located in the cut-out portions of member 43. The openings 51 are of the diameter substantially equal to the size of the slices of fruit, which when located within an opening will be stepped around in unison with the cans 44 by the Geneva gear movement.

For feeding the slices of pineapple or other fruit or vegetables to the plate 50, or more properly to the openings 51, a hopper 52 is provided, supported from an arcuate plate 53, located above and slightly spaced from the perforated plate 50. The arcuate plate 53 is held in position by a right angle arm 54. In addition to an opening in plate 53, alined with the hopper 52, a second opening is provided, having fitted therein knife guides 55. Referring to plate 47, Figure 3, it is seen that opening 49 is also fitted with similar guides 55, which are flush with the surface of the plate. In locating plate 53 and 47, with respect to each other, the knife guides are of course alined so that the cutting knife, in passing through the upright guides, will also pass through the lower ones.

The cutting mechanism is driven from a shaft 38 through means of the bevel gear 56 and gear 57, which serves to drive a horizontal shaft 59. On the outer end of this latter shaft is keyed or otherwise secured an eccentric 60, for actuating a connecting rod 61, having secured to its upper end a cross head 62, supported upon two spaced guides 63—63 which are in turn supported in upright position from cross beam 13. The cross head is adapted for reciprocating movement upon the guides in proportion to the magnitude of the eccentric. Secured to the cross head is an outwardly extending arm 65, having depending therefrom a cutting knife designated in its entirety 66, Figure 1. The knife consists of a shank 67, Figure 4, having secured thereto a cutting blade supporting member 68. To this latter member is secured the radial blades 70, sharpened at their ends 72. Due to the reciprocating movement of the cross head 62, the blades 70 are directed through the guides 55 in plate 53 through an alined opening 51 in the plate 50 and through the corresponding knife guides in the plate 47. For increasing the stability of the structural parts described, the stationary plate 47 is provided with hub portions through which the guides 63 pass.

In starting the operation of the machine, power is applied to the pulley 16, which sets into motion the various rotating parts described. Empty cans are then supplied to the feeding means, comprising the endless chain 34, which serves to present the cans to the intermittingly rotating member 43. The slices of fruit to be cut into tid-bit form are then placed in the hopper 52, which drop to the bottom and rest upon the plate 50, also intermittingly rotated. It is, of course, understood that the Geneva gear provides the step rotation for the plate and member in such a manner that the openings 51 are momentarily located directly under hopper 52. This allows several or more slices of the fruit to drop into the opening 51 and rest upon plate 47. As rotation continues, each opening 51 as it passes under the hopper is fed with the slices of fruit. In the course of operation the openings with the material located therein are momentarily stopped under the knife guides 55 in plate 53.

It is also understood that the Geneva gear imparts such an intermittent rotation to plate 50 and of course member 43, that the pauses in rotation are sufficient to allow the reciprocating knife to pass through the upper knife guides 55 and the lower guides 55 and to be retracted before the movement of the members begin again. The gearing for actuating the eccentric 60, which causes the cutting knife to complete a stroke, is so timed with the Geneva gear that one stroke is completed during each pause in the rotation.

It is clearly seen, therefore, that the material located in the openings 51 is cut into segment form while the openings are located between the knife guides 55, since at this moment the cutting knife is forced through the guides and thus through the material or fruit and then retracted. Upon the next step in the rotation of plate 50, the cut slices are brought into alinement with the opening 48, provided in plate 47. While this cutting operation is taking place, the empty cans fed to the member 43 are being stepped around in relation to plate 50, so that an empty can is always located directly under the opening 48 in plate 47. The fruit now being cut into segment form falls through the opening 48 and is deposited into the empty can which is in position to receive it. For ejecting the filled cans from member 43, a runway 75 is provided upon plate 31, so that as the cans continue their rotation they are forced into the runway and so ejected from the machine. The cycle of operations described is of course continuous as long as cans are fed to the member 43 and slices of fruit deposited into the hopper 52. After passing the cutting knife the material is emptied from the openings 51, which are therefore able to receive another supply when they reach their position under the hopper again. It is thus seen that the cutting machine when constructed in accordance with the present invention is entirely automatic in its operation, since it is only necessary to feed the fruit in sliced form to the machine, which in a single cycle of operation presents the sliced fruit to a reciprocating knife and subsequently deposits the fruit, which is then in tid-bit form, into cans located in proper position to receive it.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a cutting machine, in combination with a frame, of a main driving shaft journaled on said frame, feeding means driven from said shaft and adapted to feed cans to said machine, a second shaft, means for intermittingly rotating said second shaft, a cutting knife, and other means including a plate secured to said second shaft, and adapted to present material to the knife and to subsequently deposit the cut material into said cans.

2. In a cutting machine, in combination with a frame, of a main driving shaft journaled on said frame, feeding means driven from said shaft and adapted to feed cans to said machine, a second shaft, means for intermittingly rotating said second shaft, in timed relation to said feeding means, a cutting knife having a reciprocating movement, and other means including a plate secured to said second shaft, and adapted to present material to the knife and to subsequently deposit the cut material into said cans.

3. In a cutting machine, in combination with a frame, of a main driving shaft journaled on said frame, feeding means driven from said shaft and adapted to feed cans to said machine, a second shaft, means for intermittingly rotating said second shaft, a cutting knife, means for reciprocating said knife in timed relation with the intermittent movements of said second shaft, and other means including a plate having openings and adapted to locate material in said openings under the knife and to subsequently deposit the cut material into said cans.

4. In a cutting machine, in combination with a frame, of a main driving shaft journaled on said frame, feeding means driven from said shaft and adapted to feed cans to said machine, a second shaft, means for intermittingly rotating said second shaft, a cutting knife, means for reciprocating said knife in timed relation with the intermittent movements of said second shaft, and other means including a plate secured to said second shaft, said plate having a plurality of spaced openings, said openings being located in position under the knife during a part of its reciprocating stroke.

5. In a device of the character described in combination with a cutting knife, means for reciprocating said knife, means for presenting material to be cut by said knife during a portion of its reciprocating movement, and other means for locating receptacles into position to receive the cut material.

6. In a device of the character described, in combination with a cutting knife, means for reciprocating said knife, a stationary plate provided with two openings, one of said openings being in alignment with said knife, a second plate having a plurality of openings, and means for intermittingly rotating said second plate to successively align the openings therein with the openings in said stationary plate.

7. In a device of the character described, in combination with a cutting knife, means for reciprocating said knife, a stationary plate provided with two openings, one of said openings being in alignment with said knife, a second plate having a plurality of spaced openings and located above said stationary plate, an upright shaft upon which said second plate is mounted, and means for intermittingly rotating said shaft to successively align the openings in the second plate with the mentioned openings in said stationary plate.

8. In a device of the character described, in combination with a cutting knife, means for reciprocating said knife, a stationary plate provided with two openings, one of said openings being in alignment with said knife, a second plate having a plurality of spaced openings and located above said stationary plate, an upright shaft upon which said second plate is mounted, and means for intermittingly rotating said shaft to successively align the openings in the second plate with that opening in said stationary plate in alignment with the knife, said means being operative to hold said opening so positioned until said knife has completed a portion of its reciprocating stroke.

9. In a device of the character described, in combination with a vertically reciprocating cutting knife, a stationary plate provided with two spaced openings one of which is in alignment with the knife, a second plate having a number of spaced openings therein, an intermittently rotating shaft to which the second plate is secured in position above the stationary plate, said intermittent rotating shaft operating to successively align the openings in the second plate with those in the stationary plate in timed relation to the knife, means for filling the openings in the second plate with material to be cut, and other means for positioning cans under the other opening of the stationary plate.

Signed at Honolulu, Territory of Hawaii, this 18th day of December, 1929.

GEORGE K. SHOJI.